United States Patent [19]
Liao

[11] Patent Number: 6,092,571
[45] Date of Patent: Jul. 25, 2000

[54] PORTABLE WOOD PLANING MACHINE WITH IMPROVEMENTS RELATING TO A CUTTER AND INDICATOR

[76] Inventor: Juei-Seng Liao, No. 295, Sec. 1, Nanking East Rd., Taichung City, Taiwan

[21] Appl. No.: 09/271,934

[22] Filed: Mar. 17, 1999

[51] Int. Cl.[7] ....................................................... B27C 1/00
[52] U.S. Cl. ......................... 144/117.1; 144/130; 144/230
[58] Field of Search ............................. 144/114.1, 117.1, 144/130, 129, 218, 225, 230

[56] References Cited

U.S. PATENT DOCUMENTS

| 5,675,903 | 10/1997 | Cole | 144/117.1 |
| 5,771,949 | 6/1998 | Welsh et al. | 144/130 |
| 5,967,205 | 10/1999 | Welsh et al. | 144/117.1 |

*Primary Examiner*—W Donald Bray
*Attorney, Agent, or Firm*—Christie, Parker & Hale, LLP

[57] ABSTRACT

In a wood planing machine, a rotatable cutter seat is provided with at least one axially extending cutter receiving groove and two positioning disks at two axially opposing ends of the cutter receiving groove. A cutting element received in the cutter receiving groove has two axially opposing ends formed with axially projecting tongues. The positioning disks are notched to formed recessed tongue rest faces to seat the tongues when the cutting element is placed in the cutter receiving groove, thereby placing the cutting element in a proper orientation relative to the cutter seat without contacting the former with a groove bottom of the cutter receiving groove. The planing machine further includes an indicator which indicates a thickness that will be removed from a workpiece by the cutting element. The indicator includes a pointer and a workpiece contact element associated with the pointer. The contact element is a spring-loaded rod which has a rounded contact end, preferably with a semi-spherical shape, to contact the workpiece and is movable resiliently in a vertical direction, thereby eliminating the risk of being dragged by or stuck to the workpiece.

8 Claims, 10 Drawing Sheets

PORTABLE WOOD PLANING MACHINE WITH IMPROVEMENTS RELATING TO A CUTTER AND INDICATOR

BACKGROUND OF THE INVENTION

1. Field of the Invention

The invention relates to a wood planing machine, more particularly to a portable wood planing machine provided with improvements relating to a cutter unit and an indicator for indicating a thickness that will be removed from a workpiece by the cutter unit.

2. Description of the Related Art

Various forms of wood planing machines have existed in the art. FIG. 1 shows a portable planing machine 10 which is disclosed in U.S. Pat. No. 5,771,949. The planing machine 10 has an upper carriage 11 which is mounted on a lower base 12 via pairs of upstanding posts (not shown) and which is slidable along the posts to move upward and downward. As shown in FIG. 2, the carriage 11 carries a cutter support 131 rotated by a belt 132. A workpiece planing cutter 133 is secured to the cutter support 131 via a press plate 135 which is screwed to the cutter support 131 via screws 134 and which clamps the cutter 133 against the cutter support 131.

In order to indicate the thickness to be removed from a workpiece by the cutter 133, the carriage 11 is further provided with an indicator 16 which has a pointer 161 and a workpiece contact element 162. As best shown in FIG. 3, the pointer 161, which is pivotally mounted on the carriage 11, is connected to the workpiece contact element 162 to project downward from the carriage 11. The pointer 161 is provided with a pointing end extending to a graduated member 163. The pointing end is normally set at "zero" of the graduations on the graduated member 163. When a workpiece is fed in between the carriage 11 and the base 12, the workpiece contact element 162 will be pushed upward by the workpiece, thereby moving the pointing end upward to a graduation that indicates a thickness that will be removed from the workpiece by the planing cutter 133.

One of the problems encountered in the above-mentioned arrangement of the planing machine 10 is that assembly of the cutting element 133 is laborious due to the need to handle several screws and to align screw holes of the press plate 135 with those of the cutting element 133 and the cutter support 131. Another problem thereof resides in the workpiece contact element 162 which has a wide contact part to contact the workpiece when the workpiece is fed. As the surface of the workpiece to be processed is generally not smooth, it may drag the contact element 162 while moving under the carriage, thereby moving the contact element 162 away from a proper position and affecting adversely the performance of the pointer 161. In case the contact element 162 sticks to the workpiece, it may run the risk of becoming damaged.

FIG. 4 shows another conventional planning cutter unit 30 which comprises a substantially cylindrical cutter seat 31 having two cutter receiving grooves 32 to receive two cutting elements 35 (only one is shown), respectively. A press plate 36 with screws 37 is disposed in each groove 32 to press each cutting element 35 against the wall of the groove 32. Resilient members 34 are disposed in holes 33 provided in a groove bottom of each groove 32 to support resiliently the cutting element 35. In this cutter unit 30, although assembly of the cutting elements 35 is facilitated, the resilient members 34 may have different compressible characteristics so that the cutting elements 35 resting thereon may have their cutting edges placed out of a proper orientation relative to the cutter seat 31. In this situation, it is necessary to correct the position of the cutting elements 35 by using a tool with one hand during the process of tightening the screws to pressurise the press plate 36. Thus, the cutter unit 30 is inconvenient for assembly or replacement of the cutting element 35.

SUMMARY OF THE INVENTION

An object of the present invention is to provide a portable planing machine which can overcome the above-described disadvantages.

Another object of the invention is to provide a portable planing machine with a cutter unit which permits a cutting element to be placed readily in a proper orientation and which facilitates assembly or replacement of the cutting element.

Still another object of the invention is to provide a a cutter unit of a planing machine with positioning means that prevents a cutting element from contacting a groove bottom of a cutter receiving groove formed in a cutter seat, whereby the cutting element to be received in the cutter receiving groove can be configured to have two cutting edges.

Still further object of the invention is to provide a planing machine with an indicator having a workpiece contact element which eliminates or reduces the risk of being dragged and/or damaged by a workpiece, wherein the contact element has a smooth contact end with less contact surface and is movable resiliently in a vertical direction.

According to one aspect of the present invention, a planing machine comprises: a base having two opposing sides, and a plurality of upstanding posts extending upward from the base at the sides; an upper carriage having two opposing sides mounted movably on the upstanding posts and slidable along the posts to move upward or downward; a pair of screw rods extending upward from the sides of the base, respectively, and passing through the upper carriage; moving means associated with the screw rods for moving upward and downward the upper carriage along the posts so as to adjust a gap between the upper carriage and the base; a cutter unit disposed on the upper carriage and including a shaft having two opposite ends, a cutter seat which extends axially and angularly about the shaft between the opposite ends of the shaft and which has at least one axially extending cutter receiving groove with a groove bottom, at least one cutting element mounted inside the cutter receiving groove and including two axially opposing ends, and at least one cutting edge extending between the axially opposing ends, a press member disposed axially in the cutter receiving groove to press the cutting element against the cutter seat, and a pair of positioning members mounted on the cutter seat adjacent to said axially opposing ends of said cutting element, the positioning members having recessed tongue rest faces which are aligned axially with the cutter receiving groove, the cutting element further having two opposing tongues to project axially and outwardly from the axially opposing ends to be seated on the recessed tongue rest faces of the positioning members, the recessed tongue rest faces being formed at the same level relative to the groove bottom, thereby orienting the cutting element relative to the cutter seat; and indicator means mounted on the upper carriage and adapted to indicate thickness to be removed from a workpiece by the cutter unit, the indicator means including a pointer mounted movably on the upper carriage, and a workpiece contact element mounted movably on the upper carriage in association with the pointer so as to move the pointer when the workpiece contact element is moved by the workpiece introduced below the upper carriage.

According to another aspect of the present invention, the indicator is characterized by the workpiece contact element which includes a spring-loaded rod projecting downward from the upper carriage, and a bottom rounded contact end.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
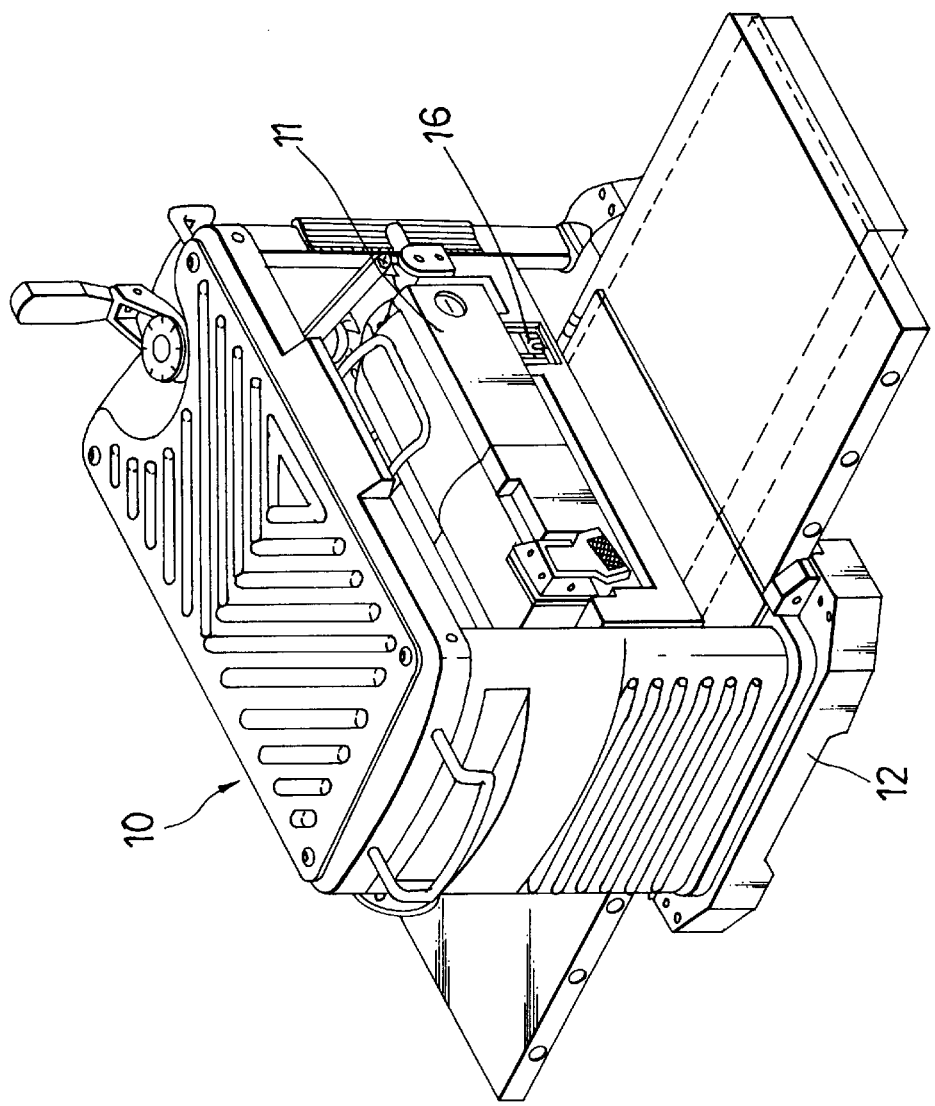
FIG. 1 shows a portable wood planing machine known in the art.
Figure 2:
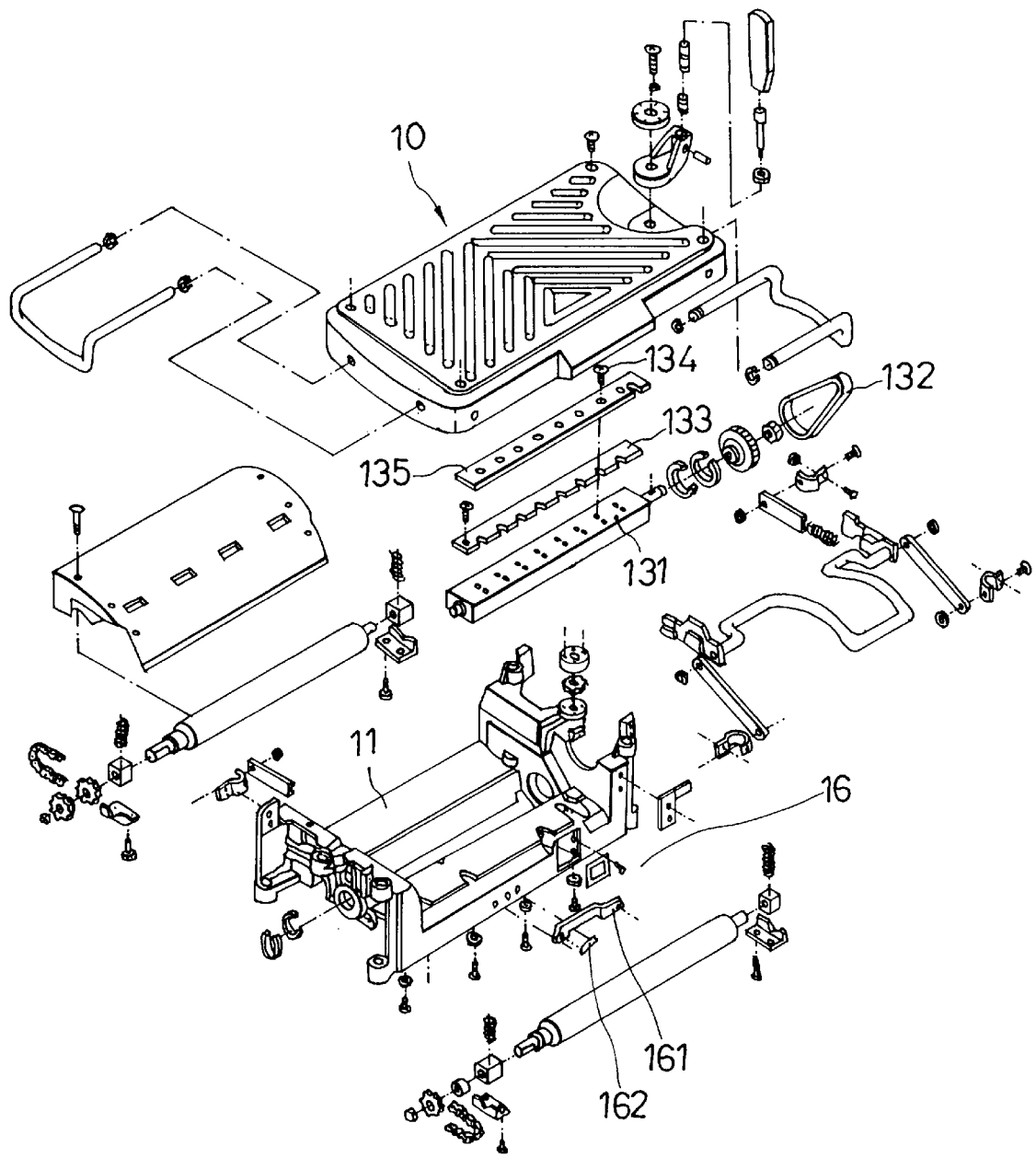
FIG. 2 is an exploded view showing a cutter unit of the wood planing machine of FIG. 1.
Figure 3:
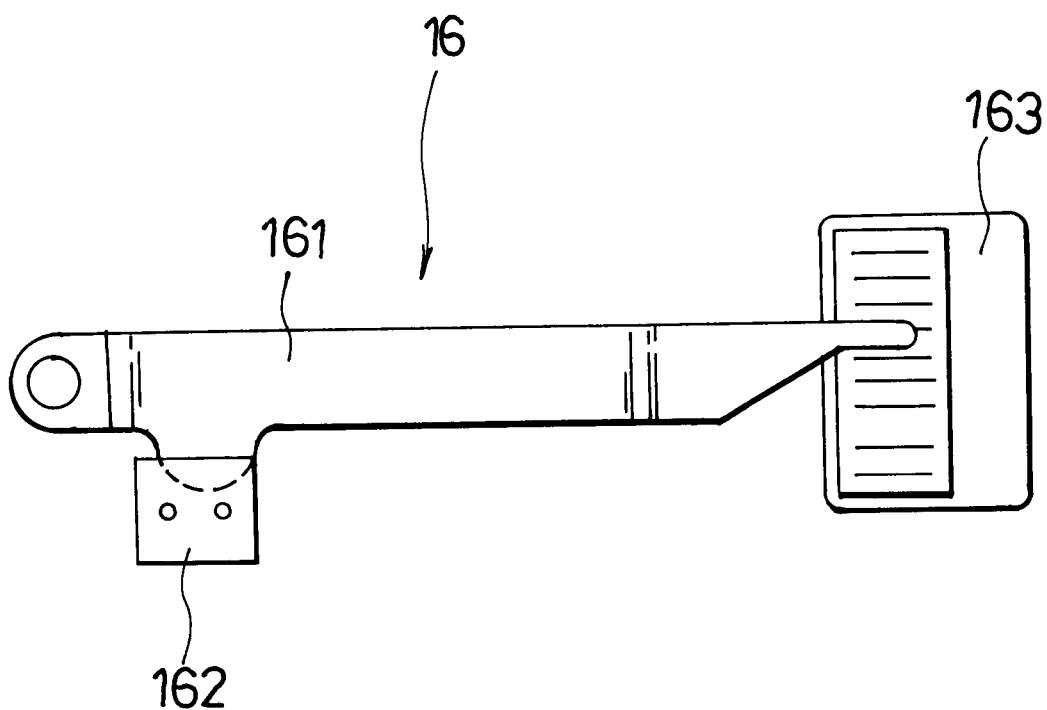
FIG. 3 is a schematic view showing an indicator of the wood planing machine of FIG. 1.
Figure 4:
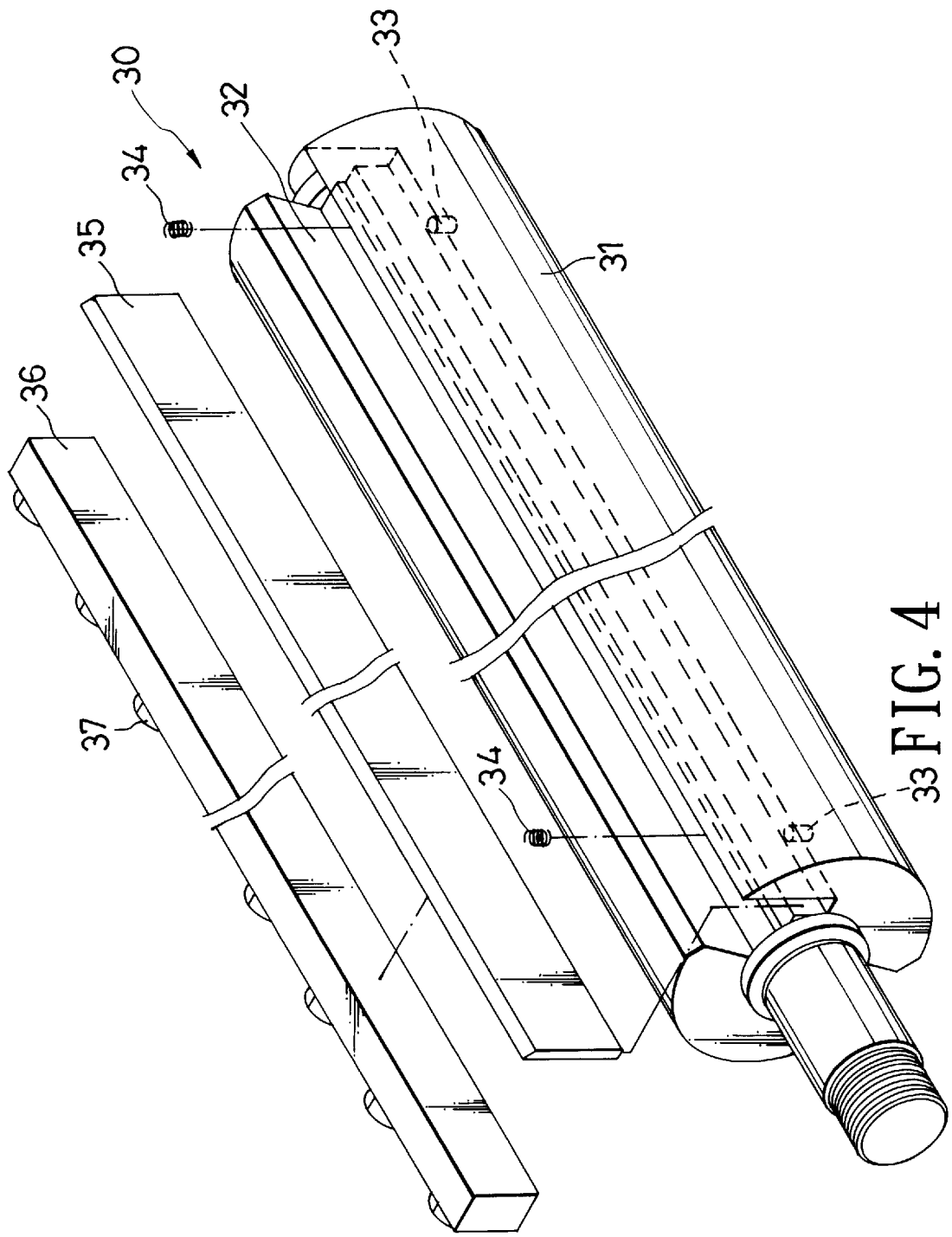
FIG. 4 shows another cutter unit known in the art.
Figure 5:
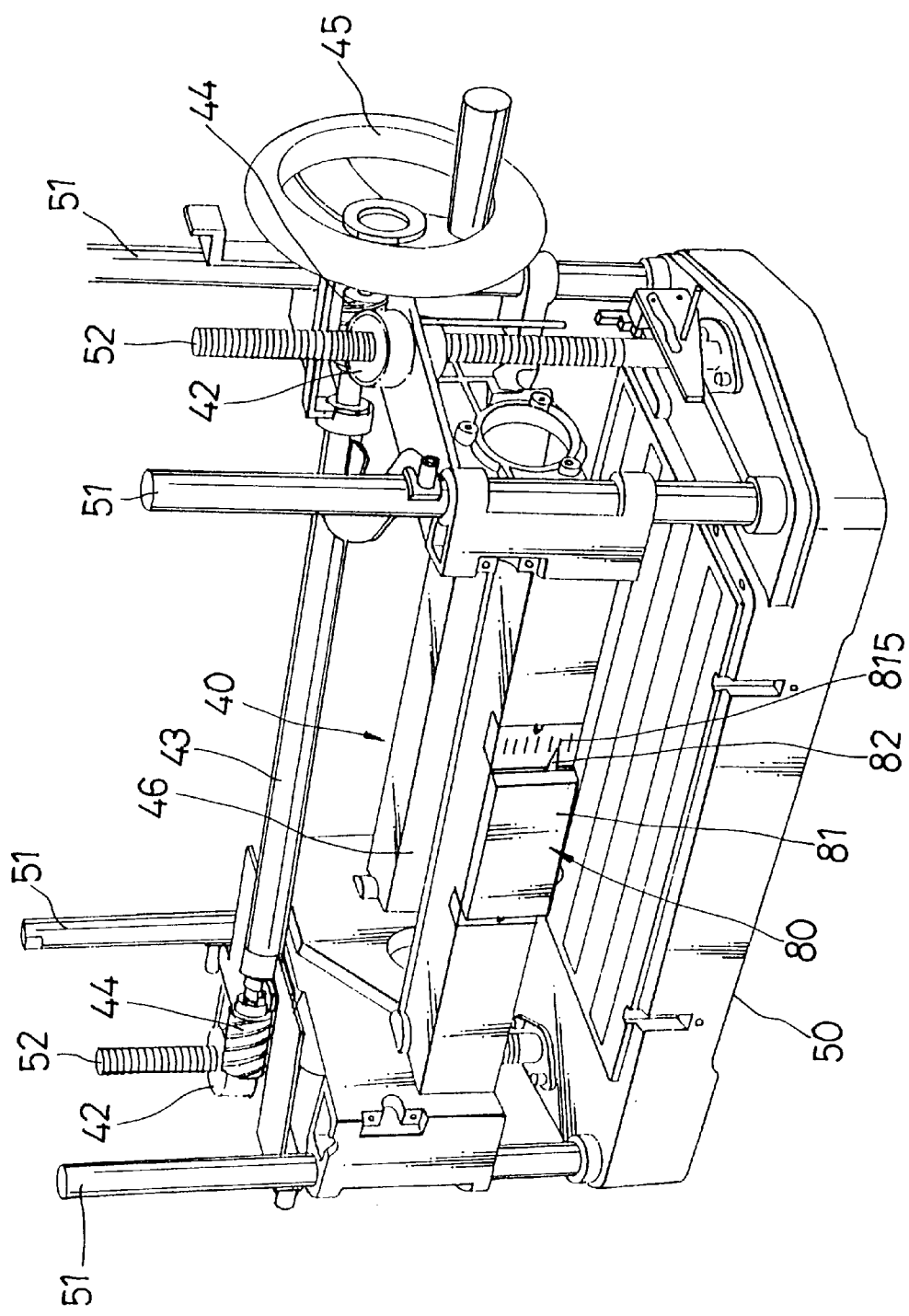
FIG. 5 is a perspective view of a wood planing machine incorporating the present invention with a housing thereof removed for the sake of clarity.

Referring to FIG. 5, a wood planing machine which incorporates the present invention is shown to include a base 50 for supporting a workpiece, and a carriage 40 which is mounted slidably on posts 51 for moving upward and downward. The base 50 is provided with a pair of screw rods 52, each of which is disposed between two adjacent posts 51 at one side of the base 50.

Moving means for moving the upper carriage 40 along the posts 51 includes two worm gears 42 which are threaded internally (not shown) to engage the screw rods 52, respectively. A rotating rod 43 is mounted on the upper carriage 40 in a bridging manner between the screw rods 52, and has two ends provided with worms 44 to engage the worm gears 42, respectively. A handle wheel 45 is connected to one end of the rotating rod 43. This moving means is detailed in a co-pending U.S. patent application of the applicant, and will not be described further for the sake of brevity.

When the handle wheel 45 is turned, the worms 44 drive the worm gears 42, thus moving the upper carriage 40 upward or downward and enabling the gap between the upper carriage 40 and the base 50 to be adjusted.

Figure 6:
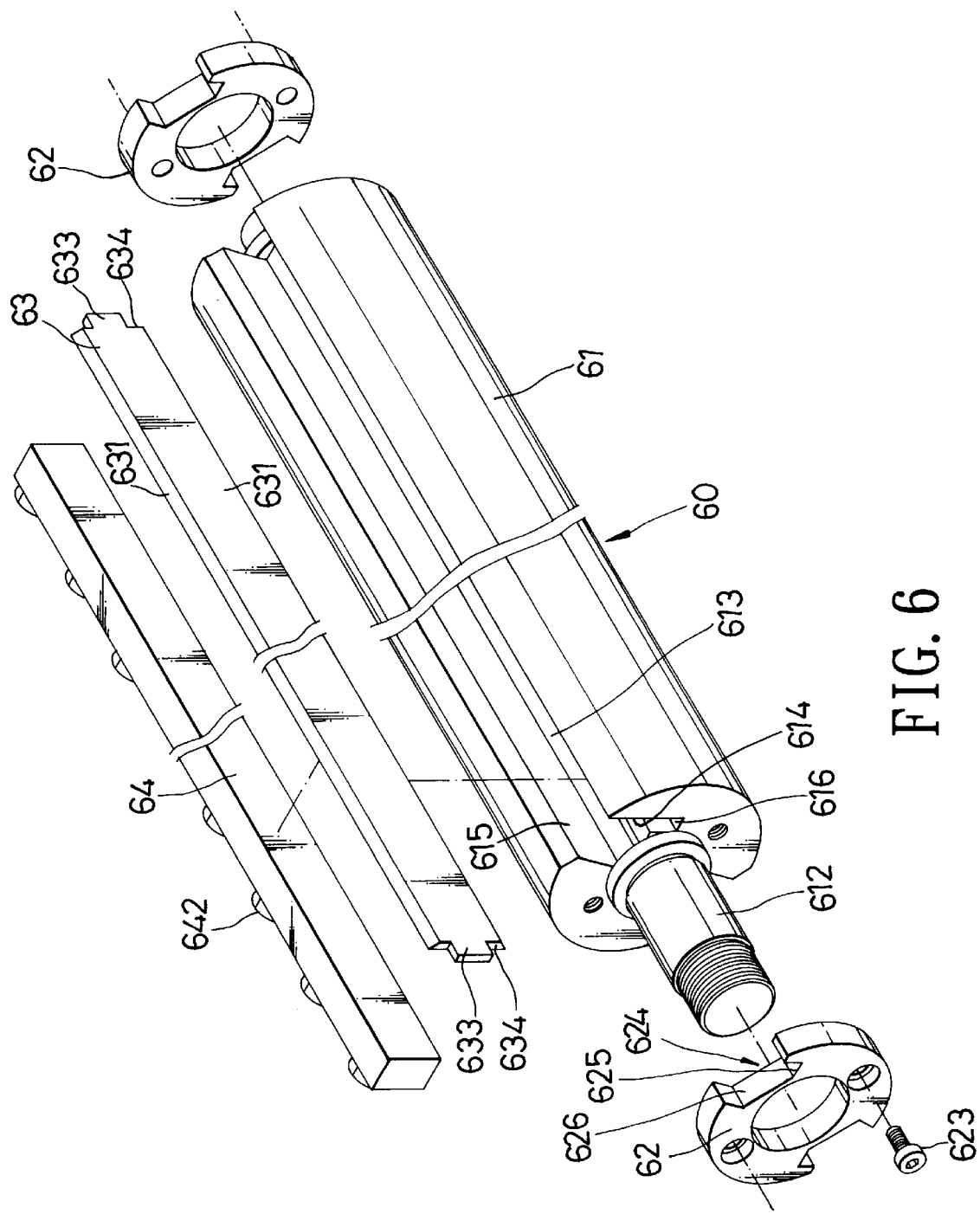
FIG. 6 is an exploded view of a cutter unit embodying the present invention, which is to be mounted on a carriage of the wood planing machine of FIG. 5.
Figure 7:
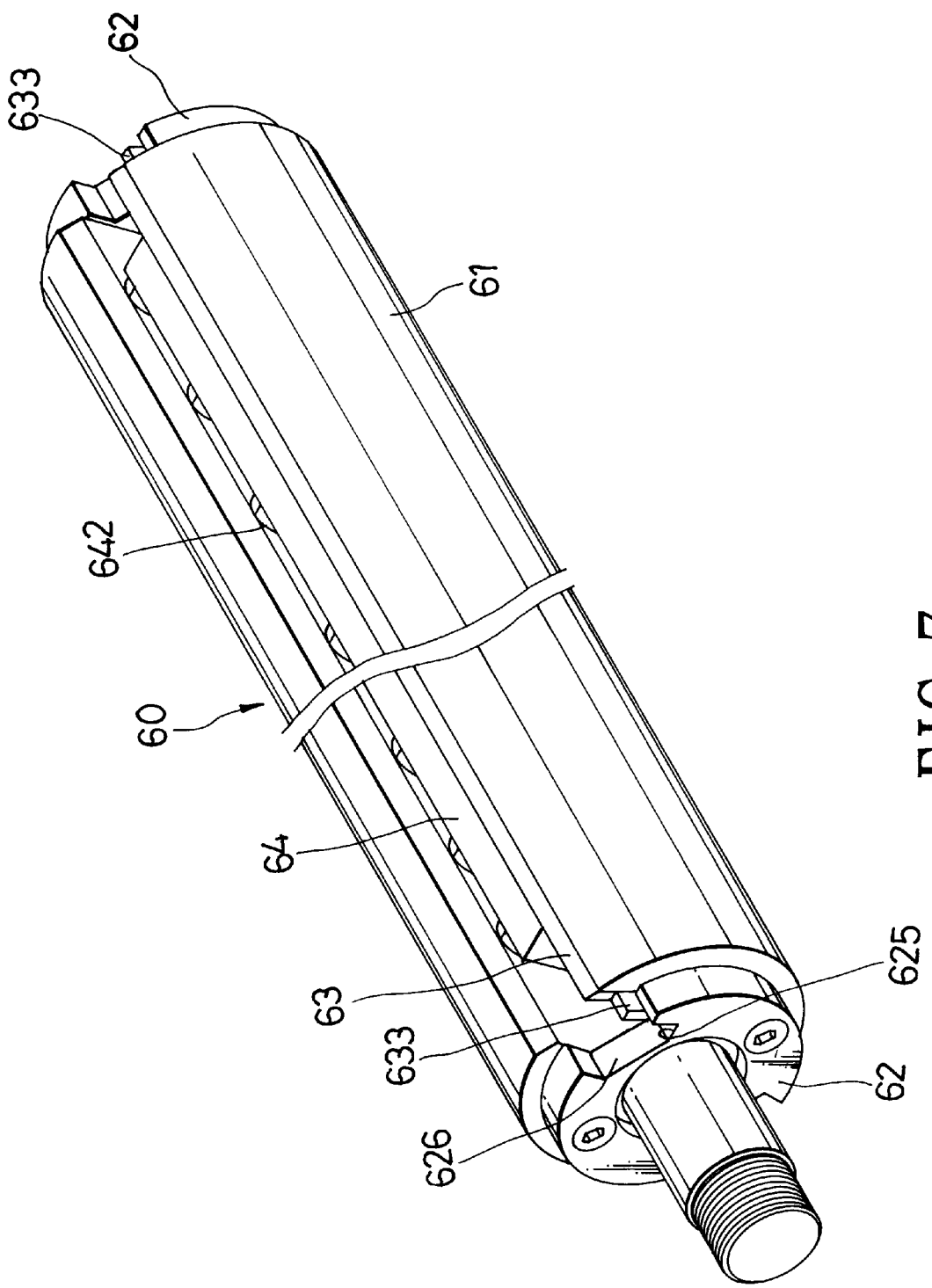
FIG. 7 is a perspective view of the cutter unit of FIG. 6.
Figure 8:
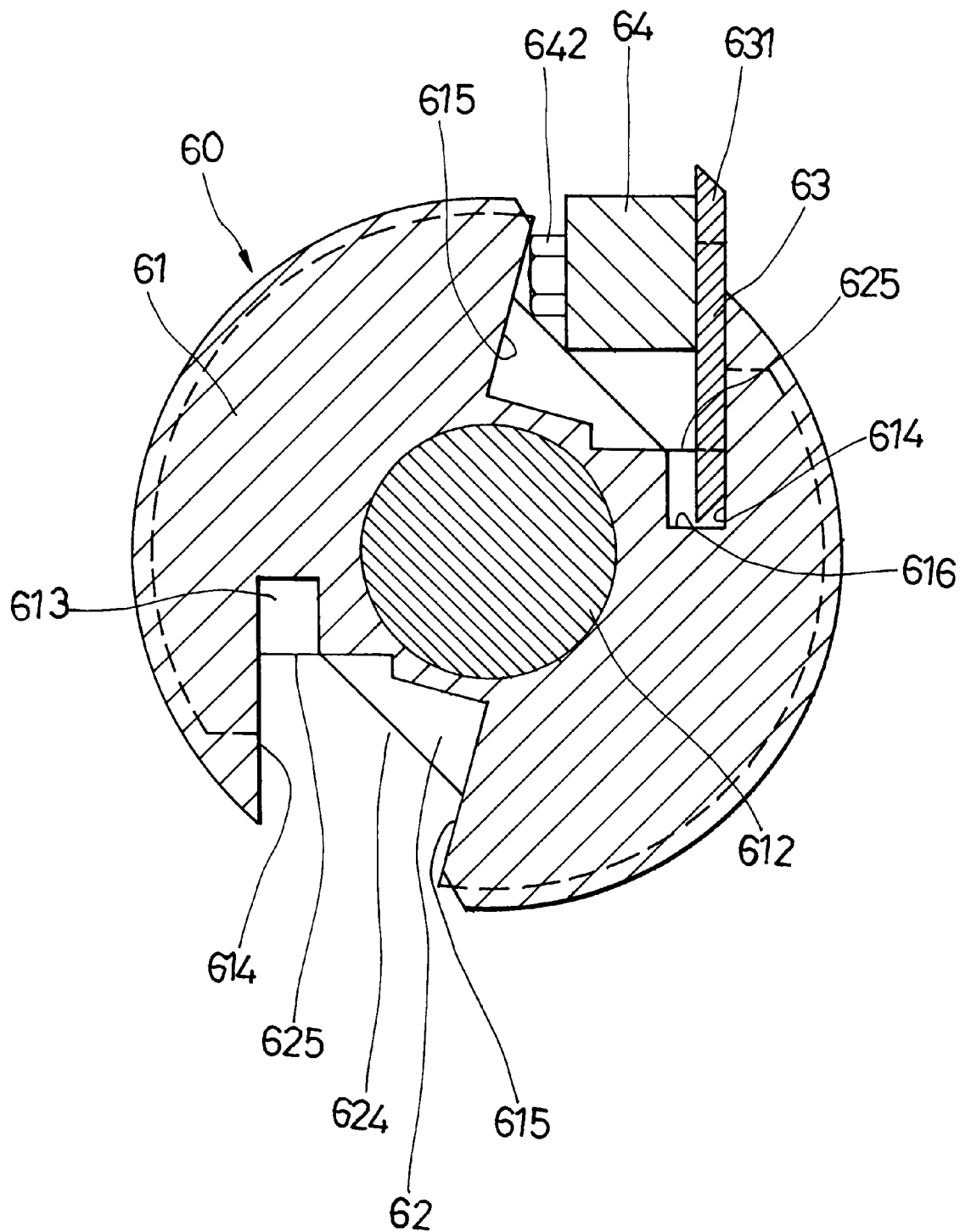
FIG. 8 is a sectional view of the cutter unit of FIG. 6.

Referring to FIGS. 6, 7 and 8, in combination with FIG. 5, the invention of this application resides in a cutter unit 60 which is mounted on the upper carriage 40 in a part designated by numeral 46. The cutter unit 60 includes a substantially cylindrical cutter seat 61 which extends axially and angularly around a shaft 612 having two ends for mounting rotatably on the upper carriage 40. The cutter seat 61 includes two cutter receiving grooves 613 at its two diametrically opposite positions for receiving therein two cutting elements 63 (only one is shown), respectively. Each cutting element 63 has two axially opposing ends 634 each of which is stepped to form a tongue 633 that projects axially and outwardly of the cutter receiving groove 613. Two axially extending cutting edges 631 of the cutting element 63 extend axially between the ends 634. Each cutting element 63 is held securely in the corresponding cutter receiving groove 613 via a press plate 64. The press plate 64 extends axially in the cutter receiving groove 613 and has a length substantially equal to that of the cutting element 63. A plurality of tightening screws 642 are attached to one side of the press plate 64.

The cutter unit 60 further includes a pair of positioning disks 62 sleeved on the shaft 612 and fixed to the two ends of the cutter seat 61 by means of screws 623. Each positioning disk 62 has a circumferential side formed with two notched parts 624 axially aligned with the cutter receiving grooves 613. Each notched part 624 has a deep recessed tongue rest face 625 which has a depth smaller than that of a groove bottom 616 of the cutter receiving groove 613, and a shallow recessed guide part 626 which extends inclinedly to the recessed tongue rest face 625.

In assembly, each cutting element 63 is inserted in the corresponding cutter receiving groove 613, and the tongues 633 thereof are seated on the recessed tongue rest face 625 of the positioning disk 62, thereby placing the cutting element 63 in contact with the cutter abutment face 614 and placing one of the cutting edges 631 of the cutting element 63, which is exposed from the cutter receiving groove 613, in a proper orientation relative to the cutter seat 61. In this situation, the cutting element 63 is spaced apart from the groove bottom 616 of the cutter seat 61 so that the other cutting edge 613 does not contact the groove bottom 616. After the screws 642 of the press plate 64 which are disposed adjacent to a press wall 615 of the cutter seat 61, are turned and tightened, the press plate 64 is pressurized against the cutting element 63 and the cutter abutment face 614 of the cutter seat 61 so that the cutting element 63 is clamped tightly in the cutter receiving groove 613.

As mentioned above, by merely seating the tongues 633 of the cutting element 63 on the recessed tongue rest faces 625 of the positioning disks 62, the cutting element 63 can be readily and quickly placed in a proper orientation relative to the cutter seat 61. No additional work for aligning and correcting the position of the cutting element 63 is necessary. This facilitates assembly and replacement of the cutting element 63. In addition, the positioning disks 62 prevent one of the cutting edges 631 of each cutting element 63, which is disposed inside the corresponding cutter receiving groove 613, from contacting the groove bottom 616, thereby eliminating the risk of causing damages to the inside cutting edge 631. This advantage permits the cutting element 63 to be provided with the two opposing cutting edges 631.

Figure 9:
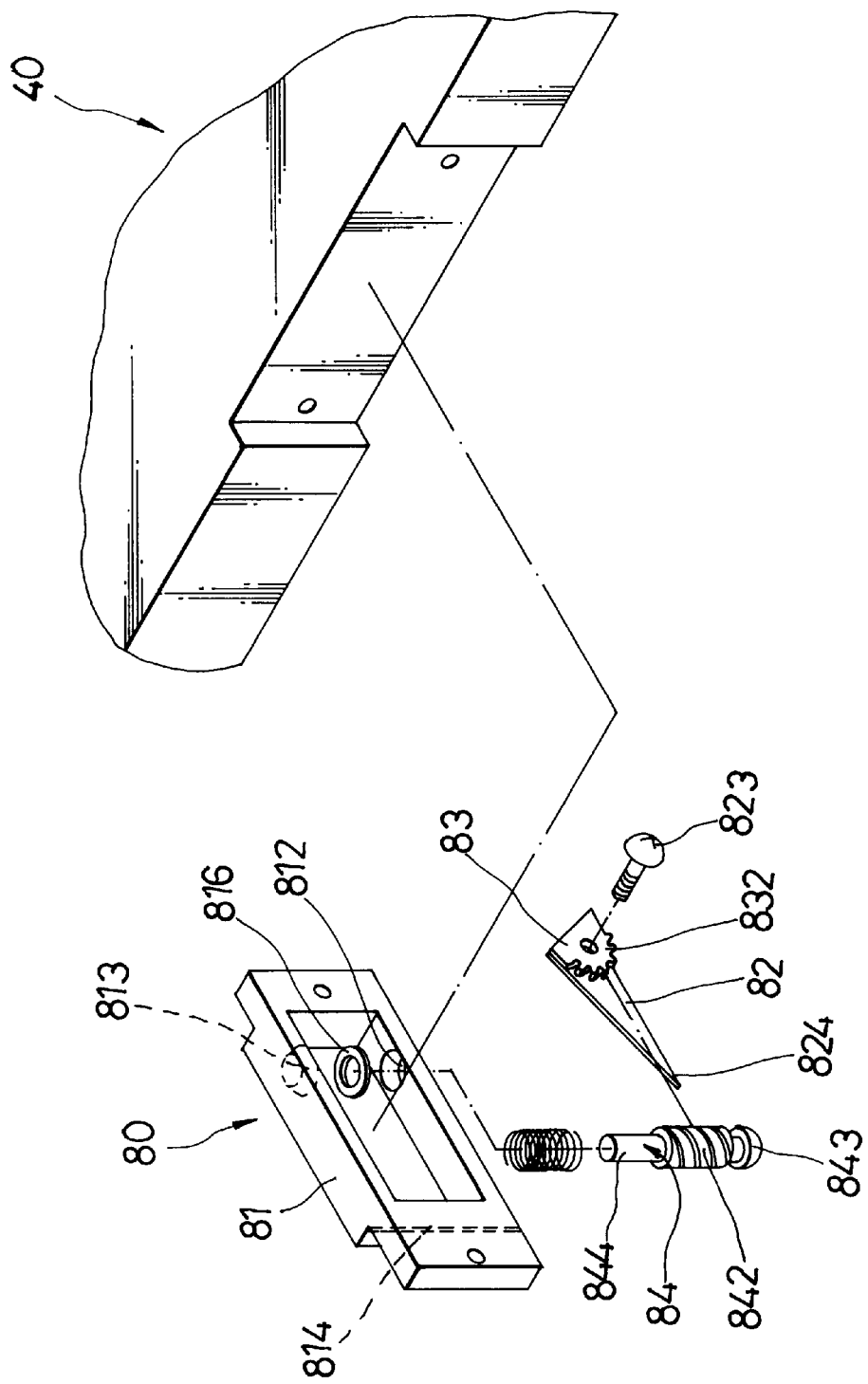
FIG. 9 is an exploded view of an indicator embodying the present invention, which is mounted on the planing machine of FIG. 5.
Figure 10:
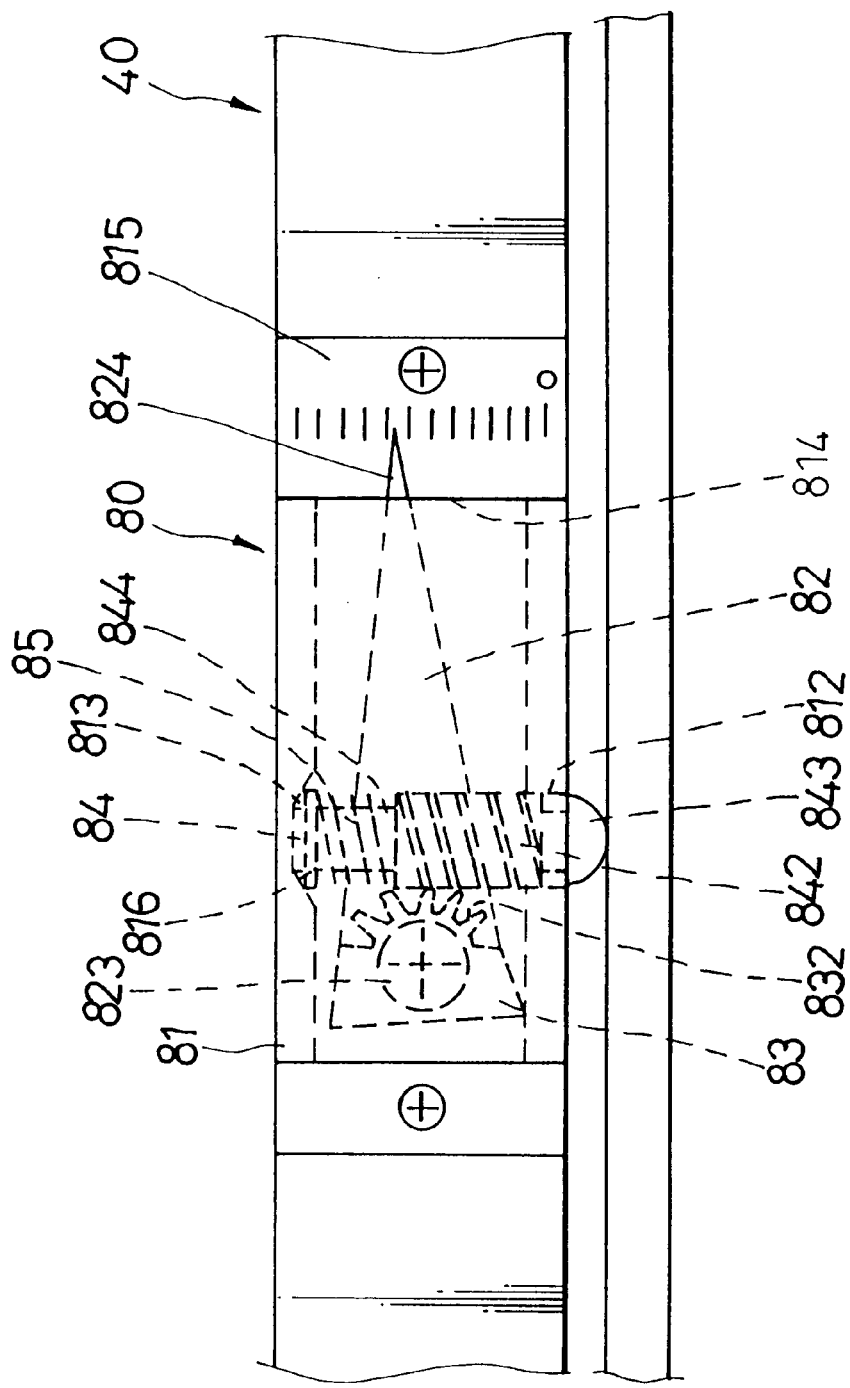
FIG. 10 is a fragmentary plan view of the planing machine of FIG. 5, showing the indicator.

Referring to FIGS. 9 and 10, in combination with FIG. 5, the present invention further resides in indicator means designated by numeral 80. The indicator means 80 comprises an indicator housing 81 which is mounted on the upper carriage 40 and which has a bottom through hole 812 and a side passage 814. A pointer 82 is mounted pivotally on an inner wall of the indicator housing 81 via a fastener 824. The pointer 82 is formed as a triangular plate and has a pointing end 824 which extends out of the indicator housing 81 through the side passage 814. A sector plate 83 is placed in side-by-side contact with the triangular plate of the pointer 82 and is connected integrally to the pointer 82 for simultaneous rotation therewith. A sector-shaped toothed end 832 is provided on the sector plate 83. At the outside of the indicator housing 81, there is a graduated scale 815 disposed adjacent to the pointing end 824 of the pointer 82.

The indicator means 80 further includes a workpiece contact element 84 which is formed as a rod and which is mounted inside the indicator housing 81. The contact element 84 includes a rounded contact end 843 which is substantially semi-spherical, a worm section 842 and a cylindrical slide rod portion 844. The contact end 843 projects downward and outward from the indicator housing 81 through the bottom through-hole 812. The slide rod portion 844 passes through an annular ring 816 to extend into an indentation 813 formed at a top wall of the indicator housing 81. A helical spring 85 is sleeved around the slide rod portion 844 between the ring 816 and the worm section 842 so that the rounded contact end 843 is normally urged to project downwardly and outwardly of the housing 81. The worm section 842 is placed in engagement with the sector-shaped toothed end 832 so that the workpiece contact element 84 will not be released outwardly from the indicator housing 81.

In operation, the contact end 843 of the workpiece contact element 84 serves to contact a workpiece. As the contact end 843, which is semi-spherical, has a smooth and reduced contact surface to contact the workpiece, it eliminates the risk of being dragged by the workpiece. In addition, since the workpiece contact element 84 is movable resiliently in a vertical direction, it is prevented from being stuck on the surface of the workpiece.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A planing machine comprising:

a base having two opposing sides, and a plurality of upstanding posts extending upward from said base at said sides;

an upper carriage having two opposing sides mounted movably on said upstanding posts and slidable along said posts to move upward or downward;

a pair of screw rods extending upward from said sides of said base, respectively, and passing through said upper carriage;

moving means associated with said screw rods for moving upward and downward said upper carriage along said posts so as to adjust a gap between said upper carriage and said base;

a cutter unit disposed on said upper carriage and including a shaft having two opposite ends for mounting rotatably on said upper carriage, a cutter seat which extends axially and angularly about said shaft between said opposite ends of said shaft and which has at least one axially extending cutter receiving groove with a groove bottom, at least one cutting element mounted inside said cutter receiving groove and having two axially opposing ends, and at least one cutting edge extending between said axially opposing ends, a press member disposed axially in said cutter receiving groove to press said cutting element against said cutter seat, and a pair of positioning members mounted on said cutter seat adjacent to said axially opposing ends of said cutting element, said positioning members having recessed tongue rest faces which are aligned axially with said cutter receiving groove, said cutting element further having two opposing tongues to project axially and outwardly from said axially opposing ends so as to be seated on said recessed tongue rest faces of said positioning members, said recessed tongue rest faces being formed at the same level relative to said groove bottom, thereby orienting said cutting element relative to said cutter seat; and indicator means mounted on said upper carriage and adapted to indicate thickness to be removed from a workpiece by said cutter unit, said indicator means including a pointer mounted movably on said upper carriage, and a workpiece contact element mounted movably on said upper carriage in association with said pointer so as to move said pointer when said workpiece contact element is moved by the workpiece introduced below said upper carriage.

2. The planing machine as claimed in claim 1, wherein said positioning members are configured as positioning disks which are disposed around said two ends of said shaft and which are screwed to said cutter seat, said positioning disks having circumferential sides which are notched to form said recessed tongue rest faces, said recessed tongue rest faces being disposed at a depth smaller than that of said groove bottom and lifting said tongues so as to prevent said cutting element from contacting said groove bottom.

3. The planing machine as claimed in claim 2, wherein said circumferential side of each of said positioning disks has a recessed guide part which is shallower and wider than said recessed tongue rest face and which extends inclinedly to said recessed tongue rest face.

4. The planing machine as claimed in claim 2, wherein said cutter seat has a pair of said cutter receiving grooves disposed in said cutter seat at two diametrically opposing positions, each of said positioning disks having a pair of said recessed tongue rest faces to be aligned with said cutter receiving grooves, respectively.

5. The planing machine as claimed in claim 2, wherein said cutting element has a pair of said cutting edges which are opposite to one another.

6. A planing machine comprising:

a base having two opposing sides, and a plurality of upstanding posts extending upward from said base at said sides;

an upper carriage having two opposing sides mounted movably on said upstanding posts and slidable along said posts to move upward or downward;

a pair of screw rods extending upward from said sides of said base, respectively, and passing through said upper carriage;

moving means for moving upward and downward said upper carriage along said posts so as to adjust a gap between said upper carriage and said base;

a cutter unit disposed on said upper carriage and including a cutter seat mounted rotatably on said upper carriage, a press member mounted on and extending axially of said cutter seat, and a cutting element extending axially of said cutter seat and pressed and clamped against said cutter seat by said press member; and indicator means mounted on said upper carriage and adapted to indicate thickness to be removed from a workpiece by said cutter unit, said indicator means including a pointer mounted movably on said upper carriage, and a workpiece contact element mounted movably on said upper carriage in association with said pointer so as to move said pointer when said workpiece contact element is moved by the workpiece introduced below said upper carriage, said workpiece contact element including a spring-loaded rod which projects resiliently downward from said upper carriage and which has a bottom rounded contact end.

7. The planing machine as claimed in claim 6, wherein said rounded contact end has a semi-spherical shape.

8. The planing machine as claimed in claim 6, further comprising a sector plate which is integrally connected to said pointer for simultaneous movement therewith and which has a sector-shaped toothed end, said rod having a worm section above said rounded contact end to engage said toothed end.

* * * * *